United States Patent [19]

Totino et al.

[11] Patent Number: 5,601,316

[45] Date of Patent: Feb. 11, 1997

[54] BELLOWS FOR CONNECTING HOSES OR APPARATUS FOR OPERATION IN A VACUUM

[75] Inventors: Ernest Totino, Ruffine; Alain Mathieu, Vandieres; Henri Wojtusciszyn, Moselle; Bernard Gouthier, Thiaucourt, all of France

[73] Assignee: Le Carbone Lorraine, Courbevoie, France

[21] Appl. No.: 390,047

[22] Filed: Feb. 17, 1995

[30] Foreign Application Priority Data

Feb. 22, 1994 [FR] France .................... 94 02220

[51] Int. Cl.⁶ .............. F16J 3/00; F01B 19/00; F16L 27/11
[52] U.S. Cl. .................. 285/226; 92/42; 92/47; 285/277; 285/298
[58] Field of Search ................ 285/226, 227, 285/228, 298, 299, 300, 301; 92/42, 47

[56] References Cited

U.S. PATENT DOCUMENTS

| | | | |
|---|---|---|---|
| 1,382,081 | 6/1921 | Heiliger | 92/42 |
| 1,561,065 | 11/1925 | Eggleston | 92/42 |
| 1,661,131 | 2/1928 | Duffield | 92/42 |
| 2,886,885 | 5/1959 | Reid, Jr. | 285/226 |
| 2,920,656 | 1/1960 | Bertolet | 92/47 |
| 2,930,116 | 3/1960 | Minges | 285/227 |
| 3,530,770 | 9/1970 | McMurry | 92/42 |
| 4,958,860 | 9/1990 | Akitsu | 285/226 |
| 4,983,104 | 1/1991 | Kingsford et al. | 92/42 |
| 5,317,955 | 6/1994 | Raser | 92/42 |
| 5,421,241 | 6/1995 | Terral | 92/42 |

FOREIGN PATENT DOCUMENTS

| | | | |
|---|---|---|---|
| 158780 | 9/1954 | Australia | 92/42 |
| 839586 | 5/1952 | Germany | 92/42 |
| 2255070 | 5/1974 | Germany | 92/42 |
| 80557 | 7/1981 | Japan | 92/42 |

Primary Examiner—Eric K. Nicholson
Attorney, Agent, or Firm—Dennison, Meserole, Pollack & Scheiner

[57] ABSTRACT

A bellows for connecting hoses or apparatus operating in a partial vacuum including a corrugated tube reinforced on the outside by rings at the troughs of the corrugations. The tube further includes toric reinforcing rings on the inside of the crests of the corrugations, the length of the rings being adjustable so as to adapt to the deformation of the corrugations in service.

9 Claims, 1 Drawing Sheet

5,601,316

BELLOWS FOR CONNECTING HOSES OR APPARATUS FOR OPERATION IN A VACUUM

FIELD OF THE INVENTION

The invention relates to bellows, particularly used in installations of the chemical type, for connecting two hoses, one hose and one apparatus, or two apparatus to one another, and carrying a fluid that is more or less corrosive under certain temperature and pressure conditions. More particularly, it relates to bellows intended for installations operating in a vacuum.

DESCRIPTION OF RELATED ART

Bellows currently used are generally constituted by a corrugated tube fixed to hoses by connection flanges, and which includes external toric rings at the troughs of the corrugations. The bellows must allow the absorption of thermal expansion and deviations in the longitudinal direction during assembly, which translates into a maximum clearance $\Delta x$ on either side of the initial position, as well as errors in alignment and lateral expansion of the hoses, which translates into a maximum clearance $\Delta y$ in a direction perpendicular to the axis of the bellows. The flexibility of the bellows must be sufficient to prevent breakage of fragile equipment, for example of glass, enamel or graphite, under the influence of sudden variations in temperature or pressure. Finally, the bellows must resist corrosion by the fluid carried and at the service temperature, and it must maintain its level of tightness at the operating pressure. One solution generally adopted to meet these requirements is to make the bellows of polytetrafluoroethylene (PTFE), made by deforming a tube under heat and pressure.

In order to operate under particular pressure conditions, it may be necessary to reinforce the bellows in order to improve its resistance to bursting. Hence, the applicants' French Patent FR 2,088,677 describes a bellows for use under elevated pressure that includes at the crest of the corrugations an outer hollow envelope of hemitoric form in addition to the outer toric ring, these reinforcements enabling better resistance to pressure while preserving for the bellows its qualities of flexibility and the amplitude of the clearances.

The bellows provided for functioning at normal pressure or at elevated pressure are not well-suited to operation in a vacuum, especially for large diameters, and do not meet the safety requirements. A first solution consists of increasing the thickness of the bellows wall, but this decreases its flexibility, and the clearances become too slight, especially for large diameters. This is why the applicants have proposed bellows of that type for operation in a vacuum only up to a diameter of 300 mm, with a length limited to 125 mm, with the maximum clearance of $\pm \Delta x$ then being 15 mm.

Another possible solution consists of using reinforcing rings, but this time placed on the inside of the bellows. In that case, one must make sure that the material chosen is resistant to corrosion by the fluid carried. On the other hand, these reinforcing rings can prevent the deformation of the corrugations that is necessary in order to adapt to variations in temperature and pressure, particularly for large diameters, and such reinforcements are not easy to put in place inside the corrugations of the bellows.

SUMMARY OF THE INVENTION

Accordingly, the object of the present invention is to enable the making of bellows for connection of hoses of large diameter that operate in a vacuum, having the same flexibility and the same longitudinal and perpendicular clearances as bellows that operate at normal pressure, while assuring good resistance to corrosion from the fluid carried, and identical safety.

In order to achieve this and other objects, the invention is directed to a bellows for connecting hoses or apparatus operating in a partial vacuum, comprising a corrugated tube reinforced on the outside by rings at the troughs of the corrugations, characterized in that it includes toric reinforcing rings on the inside of the crest of the corrugations, and that the length of the rings is adjustable in such as way as to adapt to the deformation of the corrugations during service.

One simple way of obtaining a ring whose length is adjustable to the deformation of the corrugation is to provide an open ring whose ends slide within a flexible tube.

The bellows may be made of PTFE. The reinforcing rings may be of solid PTFE, of metal resistive to corrosion from the fluid carried, or of metal coated with a polymer containing fluorine.

DESCRIPTION OF THE PREFERRED EMBODIMENTS

Figure 1:
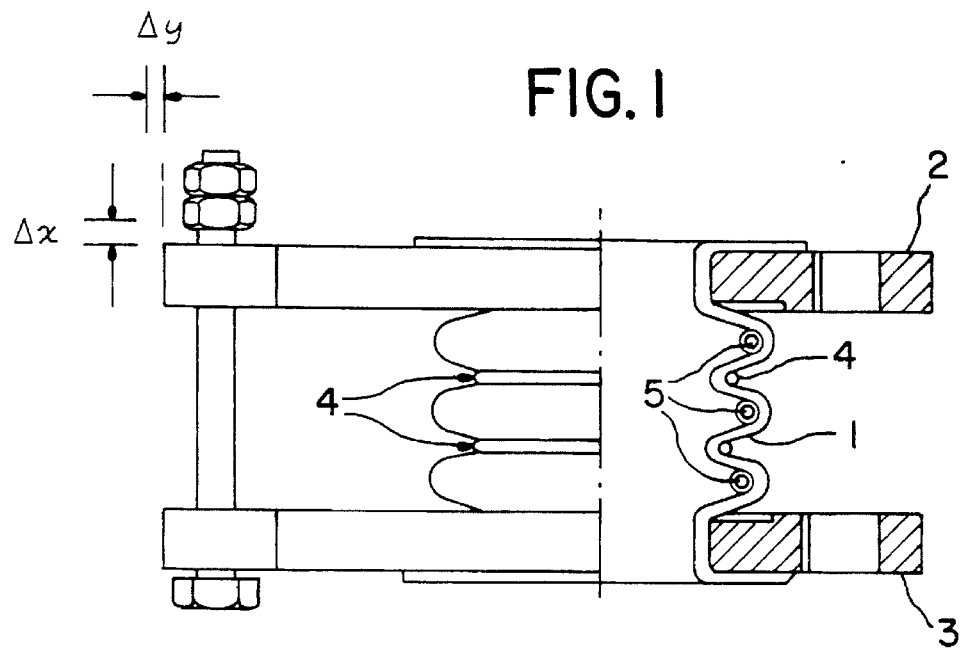
FIG. 1 is a top view in partial axial section of a bellows according to the invention.

The bellows shown in FIG. 1 is constituted by a corrugated tube (1) including a number of identical corrugations, generally from 3 to 5, which is to be connected to hoses or apparatus by way of flanges (2) and (3).

The bellows may be made of any flexible material resistant to corrosion by the fluid to be carried at the operating temperature. In particular, it may be made of PTFE, which is highly chemically inert and is stable up to 230° C., by extrusion of a paste of fine powders, to form a tube that is then deformed under heat and pressure to obtain the desired corrugations.

Figure 2:
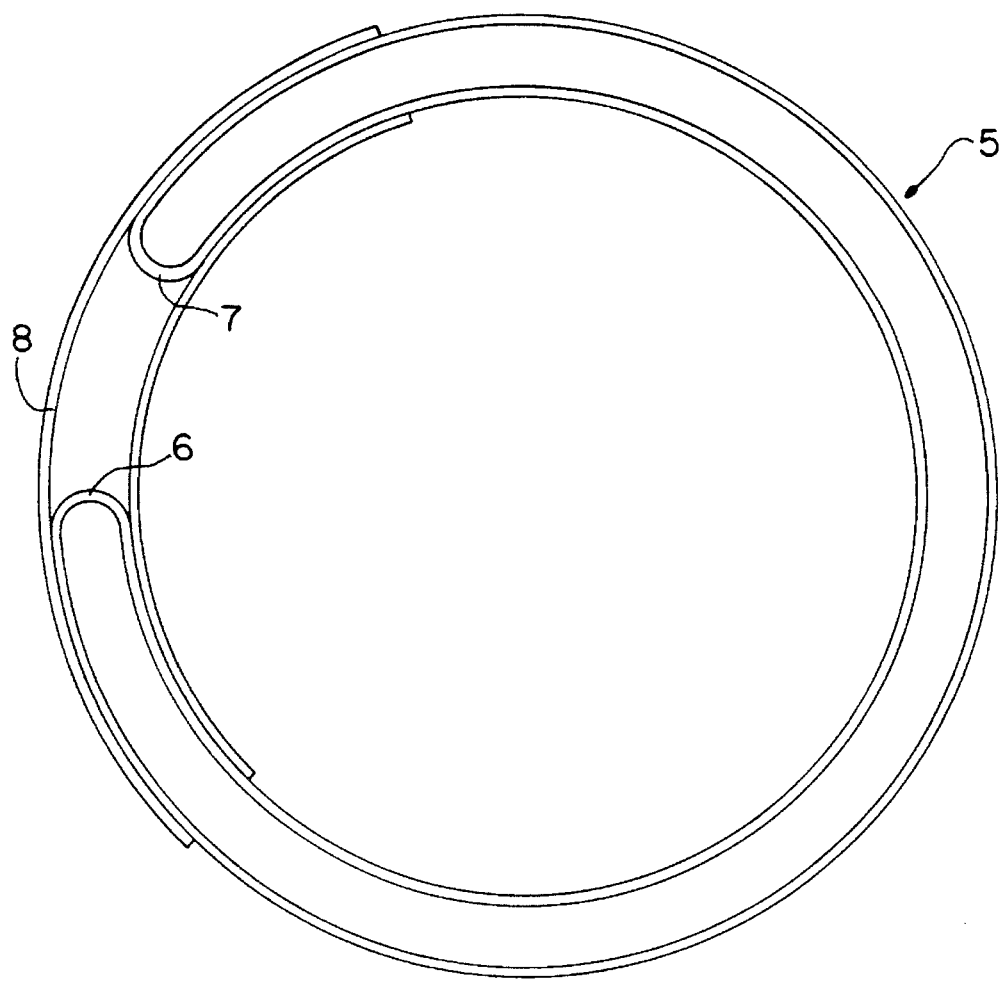
FIG. 2 is a plan view showing a reinforcing ring of adjustable length according to the invention.

Each outer trough of a corrugation is reinforced with a toric ring (4), generally of stainless steel. A toric ring (5) is placed on the inside of each corrugation crest. This ring, shown in FIG. 2, is slightly open, which facilitates its placement inside the corresponding corrugation. Moreover, to assure that the ring will conform to the deformations of the corrugation with variations in temperature and pressure, which prevents it from warping, and prevents its free ends (6) and (7) from deteriorating the interior surface of the bellows, the ends of the ring are placed inside a flexible tube (8), within which they can slide.

Since they are located inside the bellows, the rings (5) must be capable of resisting corrosion by the fluid carried. They may be made of metal, such as stainless or special steels, of solid PTFE, or, and this is often the most economic solution, of metal wire coated with polymer containing fluorine. In that case, it will be appreciated that a more ordinary metal will suffice (ordinary steel or conventional stainless steel). The polymer containing fluorine should be chosen so as to be heat-shrinkable and weldable, for the sake of effective protection of the ring and its ends; this polymer may by way of example be of the perfluoroalkoxy(PFA) type, which can be welded more reliably than PTFE.

The tube (8) in Which the ends (6) and (7) of the ring (5) slide must be as resistant to corrosion as the ring, must be sufficiently pliable to conform to the shape of the ring and the surface of the bellows, and must be capable of sliding easily, which leads one to choose PTFE, for example. The length of the tube must be sufficient so that the ends of the ring will remain inside the tube in the course of the deformation of the bellows.

For certain users who wish to use the same bellows both for installations under pressure and installations operating in a vacuum, the internal reinforcement according to the invention may be combined with the external reinforcement described in the prior art, that is, toric rings (4) located at the troughs of the corrugations, and reinforcing shells at the crests of the corrugations for the highest pressures.

The bellows according to the invention are resistant to a vacuum as pronounced as 2 torr and a temperature of 180° C., even for larger diameters. The lengths and the thicknesses of the PTFE bellows wall are the same for uses under pressure and uses in a vacuum, while maintaining adequate longitudinal and lateral clearances.

EXAMPLE

A bellows with three corrugations is made of PTFE, with a nominal diameter of 600 mm, a length between flanges of 175 mm, and a wall thickness of 3.8 mm.

One open ring, made of AISI 304 stainless steel wire, 10 mm in diameter and coated with a heat-shrinkable PFA polymer is placed in each of the corrugations. The ends of the ring slide within a PTFE tube 60 mm in length and 1 mm in thickness.

Such a bellows can operate in a vacuum of 2 torr at 180° C., with a longitudinal clearance $\Delta x$ of 30 mm and a lateral clearance $\Delta y$ of 4 mm.

What is claimed is:

1. A bellows for connecting hoses or apparatus operating in a partial vacuum, comprising a corrugated tube having outer and inner surfaces and corrugations having crests and troughs, said corrugated tube comprising reinforcing rings on the outer surface placed at the troughs of the corrugations, and toric reinforcing rings on the inner surface placed at the crests of the corrugations, the toric reinforcing rings being open and thereby having a length which is adjustable so as to adapt to deformation of the corrugations in use, said open toric reinforcing rings comprising opposite ends contained within flexible tube in which said ends slide.

2. The bellows of claim 1, wherein the corrugated tube is formed of PTFE.

3. The bellows of claim 1, wherein the toric reinforcing rings are made of metal wire coated with a polymer containing fluorine.

4. The bellows of claim 3, wherein the polymer containing fluorine is heat-shrinkable and weldable.

5. The bellows of claim 1, wherein the flexible tube is made of PTFE.

6. A bellows for connecting hoses or apparatus operating in a partial vacuum, comprising a corrugated tube having outer and inner surfaces and corrugations having crests and troughs, said corrugated tube comprising reinforcing rings on the outer surface placed at the troughs of the corrugations, and toric reinforcing rings on the inner surface placed at the crests of the corrugations, the toric reinforcing rings being made of metal wire coated with a polymer containing fluorine and having a length which is adjustable so as to adapt to deformation of the corrugations in use.

7. The bellows of claim 6, wherein the corrugated tube is formed of PTFE.

8. The bellows of claim 6, wherein the polymer containing fluorine is heat-shrinkable and weldable.

9. The bellows of claim 6, wherein the toric rings are open and comprise opposite ends contained within a flexible tube made of PTFE in which the ends slide.

* * * * *